United States Patent
Wlech

(10) Patent No.: US 6,370,903 B1
(45) Date of Patent: Apr. 16, 2002

(54) HEAT-PUMP TYPE AIR CONDITIONING AND HEATING SYSTEM FOR FUEL CELL VEHICLES

(75) Inventor: Dick Philip Wlech, Canton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/808,606

(22) Filed: Mar. 14, 2001

(51) Int. Cl.[7] ............................................. F25B 13/00
(52) U.S. Cl. ................. 62/324.6; 62/238.7; 62/239; 62/331; 62/513; 165/104.12
(58) Field of Search ..................... 62/46.2, 160, 238.7, 62/239, 324.1, 324.6, 7, 331, 159, 506, 513; 165/43, 29, 104.12

(56) References Cited

U.S. PATENT DOCUMENTS

| | | |
|---|---|---|
| 4,123,916 A | 11/1978 | Kreger |
| 4,384,608 A | 5/1983 | Scarlett et al. |
| 4,404,729 A | 9/1983 | Jensen et al. |
| 4,688,394 A | 8/1987 | Waldorf |
| 4,991,405 A | 2/1991 | Sakano |
| 5,052,189 A | 10/1991 | Akiike |
| 5,299,431 A | 4/1994 | Iritani et al. |
| 5,331,823 A | 7/1994 | Matsuoka |
| 5,355,689 A | 10/1994 | Hara et al. |
| 5,375,427 A | 12/1994 | Hara et al. |
| 5,388,421 A | 2/1995 | Matsuoka |
| 5,419,149 A | 5/1995 | Hara et al. |
| 5,438,846 A | 8/1995 | Datta |
| 5,473,906 A | 12/1995 | Hara et al. |
| 5,560,217 A | 10/1996 | Takahashi et al. |
| 5,605,051 A | 2/1997 | Iritani et al. |
| 5,615,560 A | 4/1997 | Inoue |
| 5,632,156 A | 5/1997 | Takeo et al. |
| 5,642,627 A | 7/1997 | Iritani et al. |
| 5,669,231 A | 9/1997 | Itoh et al. |
| 5,678,410 A | * 10/1997 | Fujita et al. ..................... 62/7 |
| 5,685,162 A | 11/1997 | Iritani et al. |
| 5,701,753 A | 12/1997 | Iritani |
| 5,706,664 A | 1/1998 | Hara |
| 5,706,667 A | 1/1998 | Iritani et al. |
| 5,749,235 A | 5/1998 | Ueda |
| 5,782,102 A | 7/1998 | Iritani et al. |
| 5,899,086 A | 5/1999 | Noda et al. |
| 5,910,157 A | 6/1999 | Noda |
| 5,971,289 A | 10/1999 | Kurahashi et al. |
| 5,983,652 A | 11/1999 | Iritani et al. |
| 6,035,653 A | 3/2000 | Itoh et al. |

* cited by examiner

Primary Examiner—William Doerrler
Assistant Examiner—Melvin Jones
(74) Attorney, Agent, or Firm—Brinks Hofer Gilson & Lione

(57) ABSTRACT

A heat pump type heating and air conditioning system is provided. The heat pump comprises a series of heat exchange relationships between an internal refrigeration circuit and at least one external coolant circuit. In a preferred embodiment, a fuel cell coolant circuit and an electronics coolant circuit are in heat exchange relationship with the refrigeration circuit. A method of selectively heating and/or cooling air within a passenger compartment of a fuel cell vehicle is also provided.

20 Claims, 5 Drawing Sheets

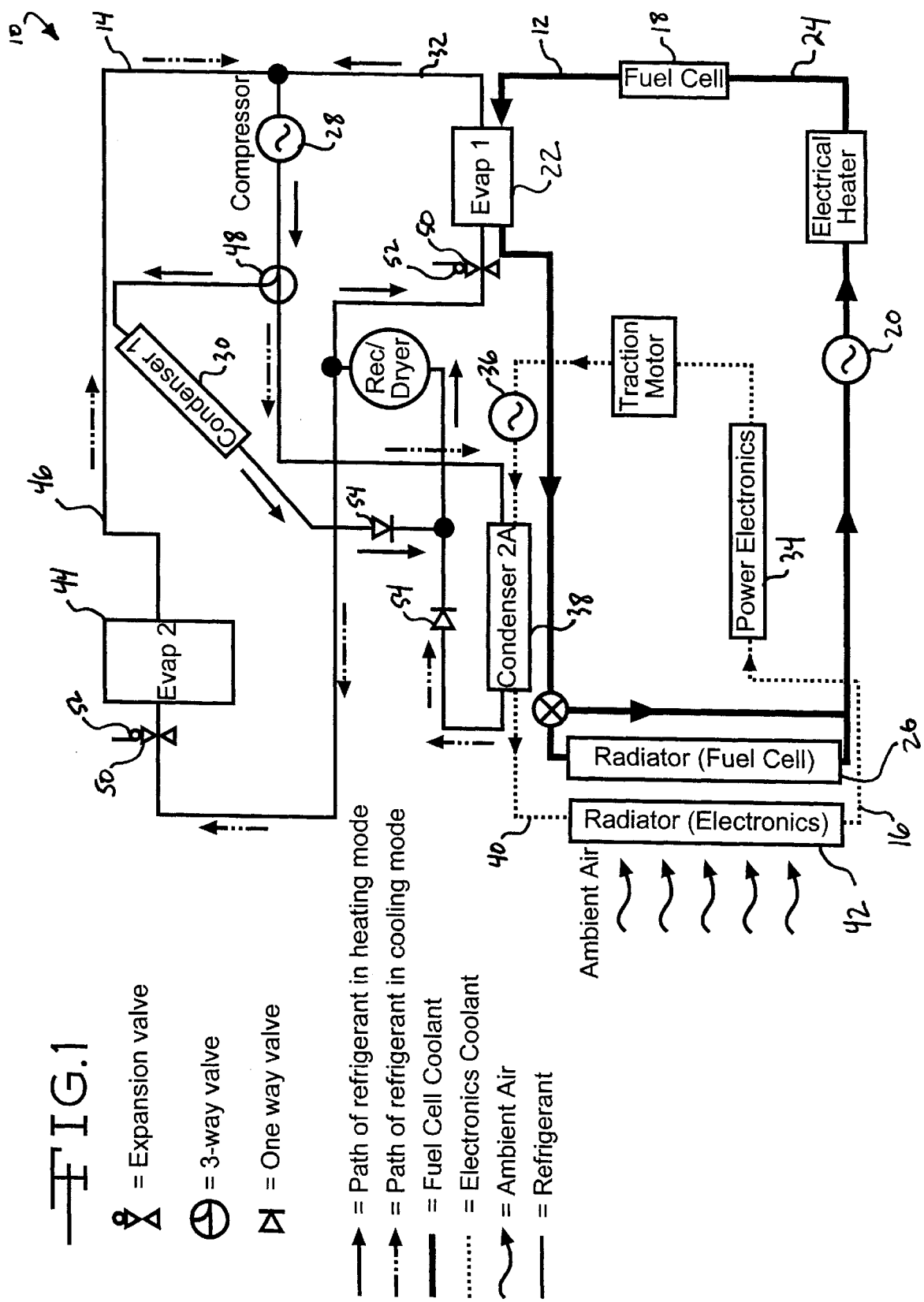

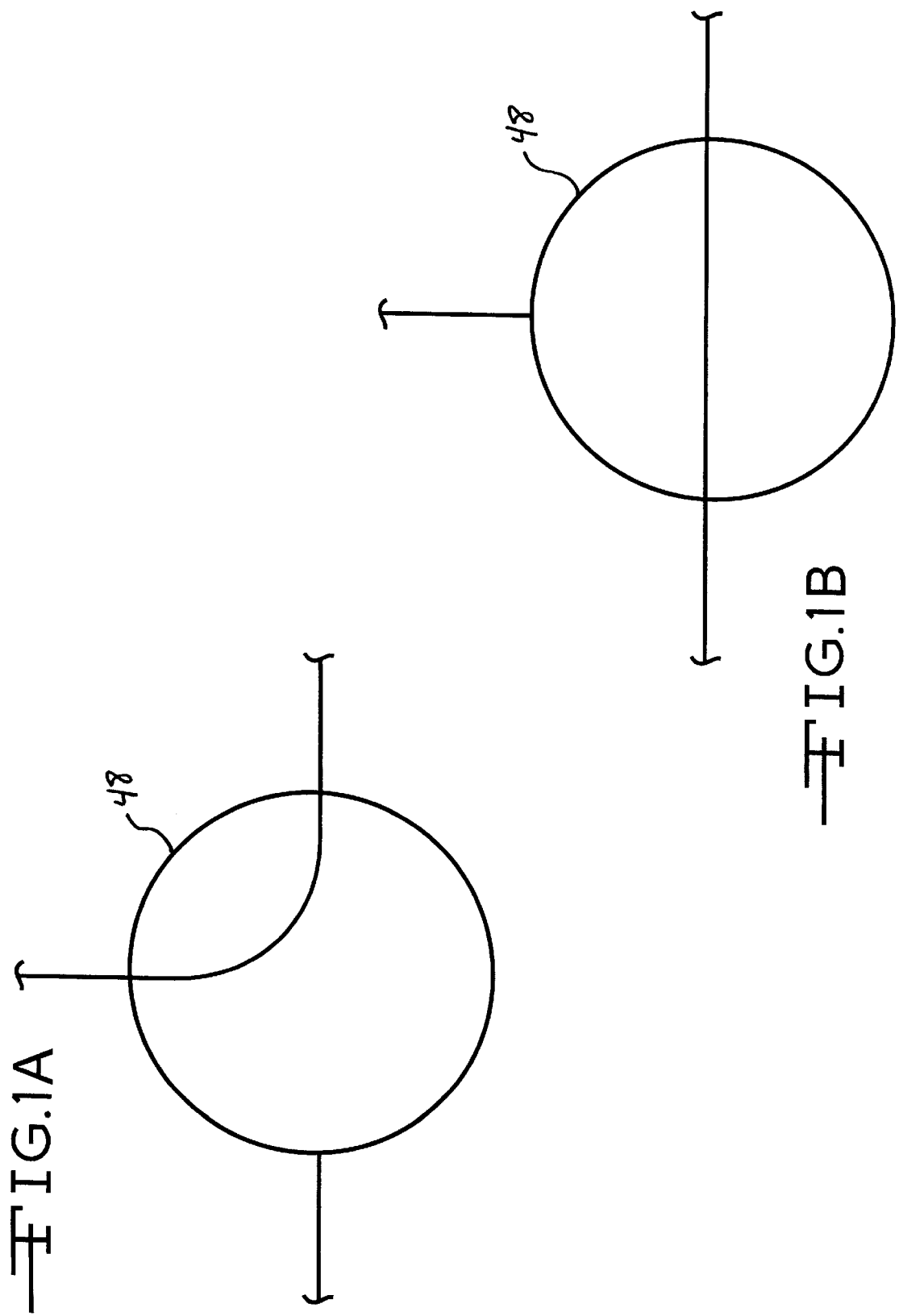

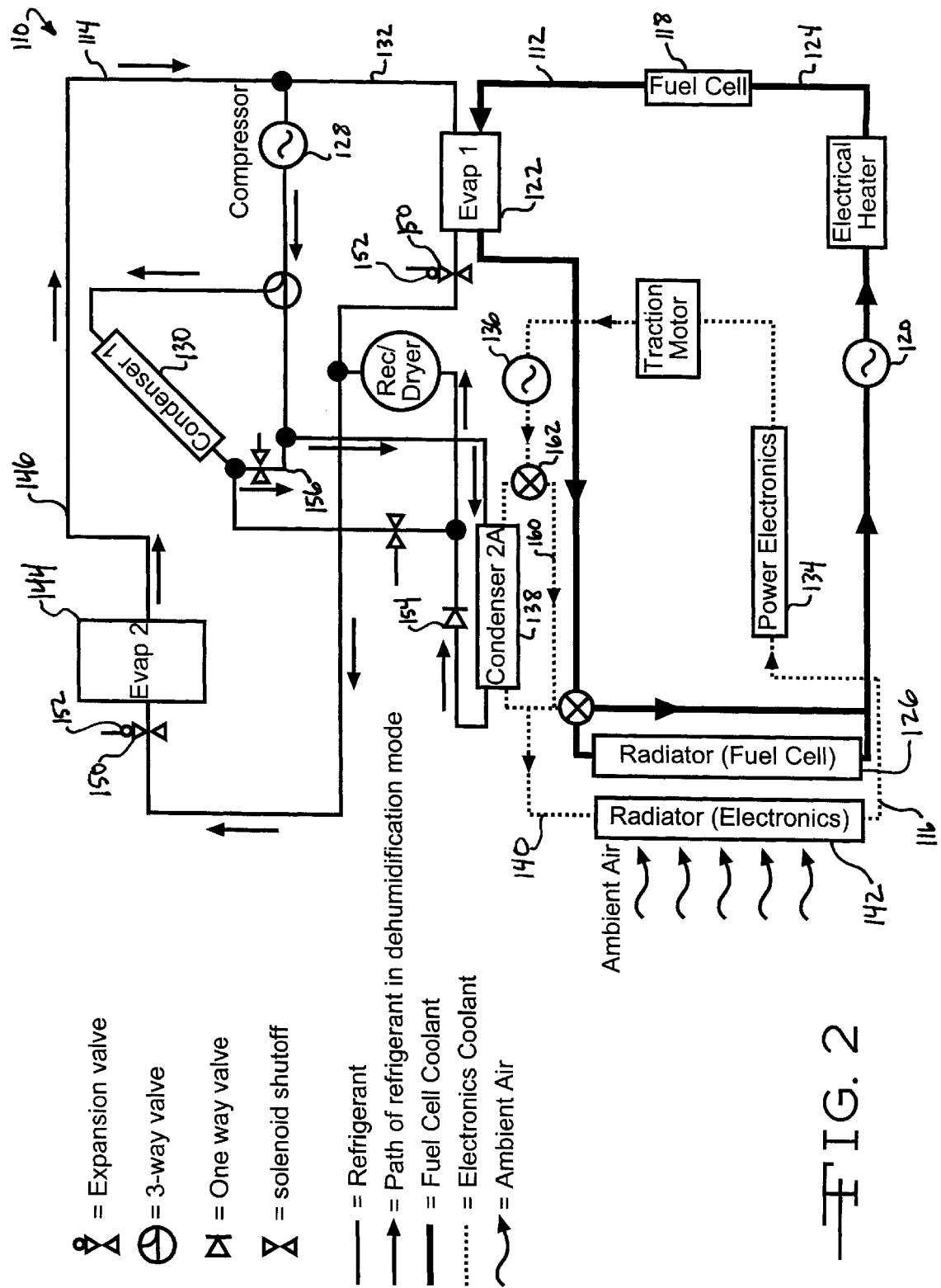

HEAT-PUMP TYPE AIR CONDITIONING AND HEATING SYSTEM FOR FUEL CELL VEHICLES

FIELD OF THE INVENTION

The present invention relates to a heat pump type air conditioning and heating system for use in vehicles, such as passenger cars and trucks. More specifically, the present invention relates to a heat pump system for use in vehicles having a fuel cell available as a source of waste heat.

BACKGROUND OF THE INVENTION

Heat pump type air conditioning and heating systems use a refrigerant that is capable of absorbing and radiating heat energy. A compressor applies a work load to the refrigerant by pressurizing it, and forces the refrigerant through a series of interconnected heat exchangers. In each heat exchanger, the refrigerant either absorbs or radiates heat energy, thereby cooling or heating a surrounding medium, such as air within a passenger cabin of a vehicle.

Prior heat pump type systems utilized ambient air to provide the waste heat necessary to further the heating and cooling cycle of the refrigerant. Due to this arrangement, these systems typically perform poorly at low ambient temperatures due to ineffective transmission of heat by the cold air. Furthermore, ice may form on the heat exchanger, reducing air flow and consequently reducing the efficiency of the system. Also, these systems cannot operate sufficiently in the absence of a relatively large source of waste heat, a problem that arises in vehicles that lack traditional engines, such as vehicles that utilize solar energy, fuel cells, and/or hybrid engine configurations.

The use of fuel cells and hybrid electric engine configurations is becoming increasingly popular in modern motor vehicles. Typically, these systems include one or more coolant circuits that serve to cool the various electronic components of the systems.

SUMMARY OF THE INVENTION

The present invention provides a heat pump type heating and/or air-conditioning system for a vehicle. The system utilizes external coolant circuits in a heat exchange relationship with a refrigerant to provide the necessary transfer of heat energy that allows the circuit to operate. In a preferred embodiment, the heat pump system comprises an external fuel cell coolant circuit and an internal refrigeration circuit. The fuel cell coolant circuit includes an external evaporator and the refrigeration circuit includes an internal condenser. The external evaporator defines a heat exchange relationship between the refrigerant of the refrigeration circuit and coolant of the fuel cell coolant circuit. This relationship allows the refrigeration circuit to gather waste heat from the fuel cell coolant circuit. Also, the internal condenser defines a heat exchange relationship between the refrigerant and the air within the vehicle. This relationship allows the refrigeration circuit to utilize the energy gathered from the fuel cell circuit to transfer heat energy to the air of the vehicle.

Preferably, the refrigeration circuit also includes an internal evaporator and the heat pump system also includes an external electronics coolant circuit. The electronics coolant circuit includes an external condenser that defines a heat exchange relationship between the electronics coolant and the refrigerant. This relationship allows the refrigeration circuit to dump heat into the electronics coolant circuit. Also, the internal evaporator defines a second heat exchange relationship between the refrigerant and the air within the vehicle. This relationship provides a point at which the refrigeration circuit can transfer heat energy from the air of the vehicle. Preferably, the heat pump system further includes a multiposition valve that selectively allows refrigerant to travel to either the internal condenser or the external condenser, thereby allowing a user to select between heating and air-conditioning modes.

The present invention also preferably includes an arrangement that allows for a dehumidification operation. In this embodiment, the heat pump system includes a junction passageway that allows refrigerant to flow through both the internal and external condenser and the internal evaporator, which allows the air of the vehicle to be cooled prior to heating.

The present invention also provides a method of selectively heating or cooling air within a passenger compartment of a vehicle. The method comprises gathering waste heat from an external coolant, such as a fuel cell coolant, transferring heat energy from the waste heat to a refrigerant, transferring heat energy between the refrigerant and a second coolant, such as an electronics coolant, and ultimately transferring heat energy between the refrigerant and the air within the vehicle.

BRIEF DESCRIPTION OF THE DRAWINGS

FIG. 1 is a schematic diagram view of a first preferred embodiment of a heat pump type heating and air-conditioning system for a vehicle in accordance with the present invention.

FIG. 1A is a schematic diagram view of a multiposition valve in the heat pump of FIG. 1 oriented to allow heating of the air of the vehicle.

FIG. 1B is a schematic diagram view of a multiposition valve in the heat pump of FIG. 1 oriented to allow cooling of the air of the vehicle.

FIG. 2 is a schematic diagram view of a second preferred embodiment of a heat pump type heating and air-conditioning system for a vehicle in accordance with the present invention.

DETAILED DESCRIPTION OF THE PREFERRED AND ALTERNATE EMBODIMENTS OF THE INVENTION

Figure 3:
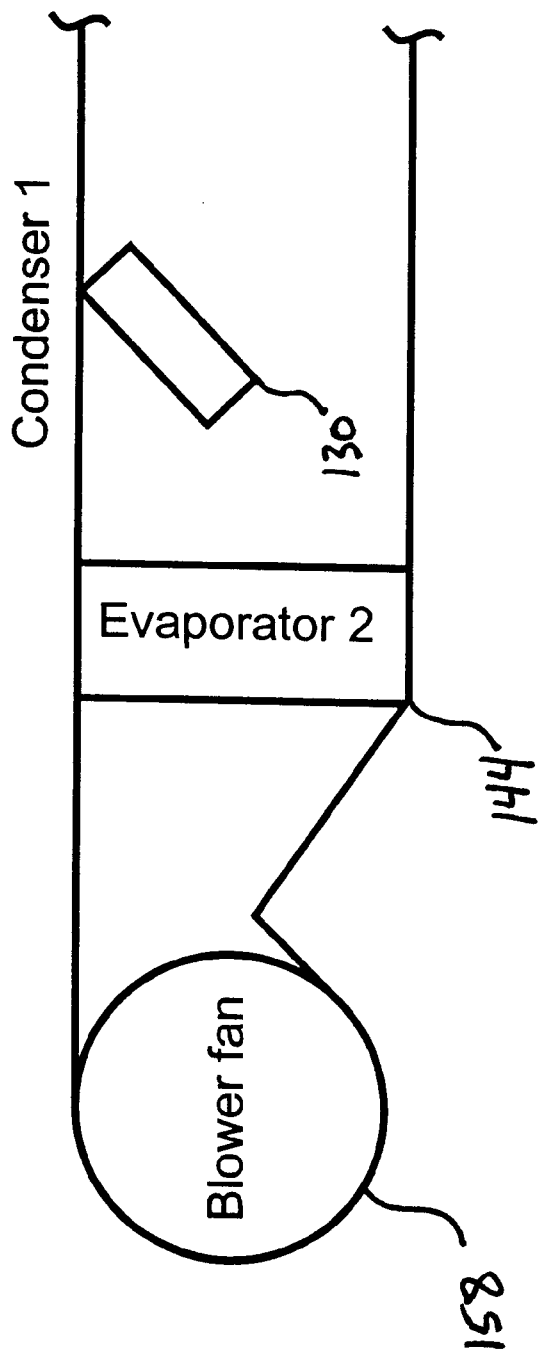
FIG. 3 illustrates a preferred relationship between a standard blower and the heat pump system of the present invention that allows for dehumidification of the air of the vehicle.

The following description of preferred and alternate embodiments of the present invention provides examples of the present invention. The embodiments discussed herein are merely exemplary in nature, and are not intended to limit the scope of the invention in any manner. Rather, the description of these embodiments serves to enable a person of ordinary skill in the relevant art to make and use the present invention FIG. 1 illustrates a first preferred embodiment of the present invention. A heat pump type heating and air-conditioning system for incorporation in a vehicle is illustrated and generally indicated at reference 10. The heat pump 10 includes a first external coolant circuit 12 and a refrigeration circuit 14. Preferably, the heat pump 10 also includes a second external coolant circuit 16.

The first external coolant circuit 12 preferably comprises a fuel cell coolant circuit. These circuits are common in vehicles that utilize fuel cells and/or hybrid engine configurations and serve to cool the components of these alternative power sources. As illustrated in FIG. 1, the fuel cell coolant circuit 12 preferably comprises a fuel cell 18, a first fluid pump 20, an external evaporator 22, a first passageway 24, and a radiator 26. The first fluid pump 20 applies a workload to a fuel cell coolant, which then circulates through the first passageway 24 and absorbs heat generated by the fuel cell 18. Of course, the first external coolant circuit 12 can comprise any coolant circuit. No matter the cooling function of the first external coolant circuit 12, it is preferred that the circuit 14 utilize a liquid coolant. If a gas is used as the coolant, a compressor can be used in place of the fluid pump.

The refrigeration circuit 14 includes a compressor 28, an internal condenser 30, the external evaporator 22 of the first external coolant circuit 12, and a second passageway 32. The second passageway 32 provides fluid communication between the compressor 28, the internal condenser 30, and the external evaporator 22. The compressor 28 applies a workload to a refrigerant, which circulates through the second passageway 32. The refrigerant absorbs the waste heat of the first external coolant circuit 12 in the external evaporator 22. Thus, the external evaporator 22 defines a heat exchange relationship between the refrigerant of the refrigeration circuit 14 and the coolant of the first external coolant circuit 12. The external evaporator 22 is preferably in communication with both the refrigeration circuit 14 and the first external coolant circuit 12.

The internal condenser 30 preferably defines a heat exchange relationship between the refrigerant and the air within the vehicle. The refrigerant dumps heat energy into the air surrounding the internal condenser 30. The term "air", as used herein, comprises air within a passenger compartment of the vehicle or air that will be directed to the passenger compartment by a blower or other standard means.

The second external coolant circuit 16 preferably comprises an electronics coolant circuit. These circuits 16 are common in vehicles that utilize fuel cells and/or hybrid engine configuration and serve to cool the electronic componentry associated with these alternative power sources. As illustrated in FIG. 1, the electronics coolant circuit 16 comprises various power electronics 34, a second fluid pump 36, an external condenser 38, a third passageway 40, and a radiator 42. The second fluid pump 36 applies a workload to the electronics coolant, which then circulates through the third passageway 40. The external condenser 38 defines a heat exchange relationship between the refrigerant of the refrigeration circuit 14 and the coolant of the second external coolant circuit 16. The external condenser 38 is preferably in communication with both the refrigeration circuit 14 and the second external coolant circuit 16. Of course, the second external coolant circuit 16 can comprise any coolant circuit. Similar to the first external coolant circuit 12, it is preferred that the second external coolant circuit 16 utilize a liquid coolant, but can alternatively comprise any suitable coolant. If a gas is used as the coolant, a compressor can be used in place of the fluid pump.

As illustrated in FIG. 1, the refrigeration circuit 14 preferably further shares the external condenser 38 with the second external coolant circuit 16, an internal evaporator 44, a fourth passageway 46, and a device adapted to allow the refrigerant to flow through either the second 32 or fourth 46 passageways. Preferably, the device comprises a multiposition valve 48. The fourth passageway 46 provides fluid communication between the compressor 28, the external condenser 38, and the internal evaporator 44. The refrigerant absorbs heat energy from the air surrounding the internal evaporator 44, which preferably comprises air within a passenger compartment of the vehicle or air that will be directed to the passenger compartment. Thus, the internal evaporator 44 defines a heat exchange relationship between the refrigerant and the air within the vehicle.

The multiposition valve 48 is preferably positioned on a refrigerant output side of the compressor 28 of the refrigeration circuit 14. The multiposition valve 48 preferably allows the refrigerant to be selectively directed through either the second passageway 32 or the fourth passageway 46. This configuration allows the multiposition valve 48 to direct refrigerant to either the internal condenser 30 or the external condenser 38. Based on a heat exchange relationship defined by these elements, the multiposition valve 48 therefore allows for the selective heating or cooling, respectively, of air within the vehicle.

To facilitate the heat exchange function of the external 22 and internal 44 evaporators, the heat pump 10 preferably includes one or more expansion valves 50 positioned on refrigerant inlet sides of these evaporators 22, 44. It is preferred that these expansion valves are positioned in the second 32 and fourth 46 passageways. Also, it is preferred that the heat pump 10 further include one or more shut-off valves 52 that can be manipulated to impede flow of the refrigerant to the various heat exchangers. As illustrated in FIG. 1, it is preferred that a shut-off valve 52 is positioned in the second passageway 32 such that flow of the refrigerant to the external evaporator 22 can be stopped. Also, is preferred that a second shut-off valve 52 is positioned in the fourth passageway 46 such that flow of the refrigerant to the internal evaporator 44 can be stopped. These valves 52 preferably comprises an integral component of the expansion valves 50. Particularly preferred for these valves 52 are throttled expansion valves having solenoid shutoff controls. Alternatively, any valve that can partially or totally impede flow of refrigerant within the respective passageway can be utilized.

The heat pump 10 preferably also includes one or more one-way valves 54 positioned at various locations in the passageways. These one-way valves 54 are preferably positioned such that refrigerant is able to flow only in a direction toward one of the evaporators 22, 44. As illustrated in FIG. 1, it is preferred that a first one-way valve 54 is positioned in the second passageway 32 on a refrigerant outlet side of the internal condenser 30. Also, it is preferred that a second one-way valve 54 is positioned in the fourth passageway 46 on a refrigerant outlet side of the external condenser 38. Alternatively, any number and arrangement of one-way valves 54 that ensure proper direction of refrigerant flow can be incorporated into the heat pump system 10.

In FIG. 1, the solid line arrows indicate the flow of refrigerant through the heat pump 10 when heating of the air within the vehicle is desired. The compressor 28 applies a workload to the refrigerant and propels the refrigerant toward the multiposition valve 48. For heating, as shown in FIG. 1A, the multiposition valve 48 is positioned in a manner that directs refrigerant along the second passageway 32 toward the internal condenser 30. Thus, after passing through the multiposition valve 48, the refrigerant travels along the second passageway 32 and enters the internal condenser 30. As indicated above, the internal condenser 30 defines a refrigerant-to-air heat exchanger. Consequently, the refrigerant dumps heat energy into the air surrounding the condenser 30, thereby heating the air within the vehicle. The cooled refrigerant then exits the internal condenser 30 and continues to travel along the second passageway 32 toward the external evaporator 22. As indicated above, the external evaporator 22 defines a refrigerant-to-coolant heat exchanger. Therefore, in the external evaporator 22, the refrigerant absorbs heat from the coolant of the first external coolant circuit, As a result, the refrigerant is heated and the coolant is cooled. After exiting the external evaporator 22, refrigerant continues along the second passageway 32 and returns to the compressor 28.

The phantom line arrows shown in FIG. 1 indicate that flow of refrigerant through the heat pump system 10 when cooling of the air within the vehicle is desired. Again, the compressor 28 applies a workload to the refrigerant and propels the refrigerant toward the multiposition valve 48. For cooling operations, as shown in FIG. 1B, the multiposition valve 48 is positioned in a manner that directs refrigerant along the fourth passageway 46 toward the external condenser 38. Thus, after passing to the multiposition valve 48, the refrigerant travels along the fourth passageway 46 and enters the external condenser 38. As indicated above, the external condenser 38 defines a refrigerant-to-coolant heat exchanger. Consequently, the refrigerant dumps heat energy into the coolant of the second external coolant circuit 16. As a result, the refrigerant is cooled and the coolant of the second external coolant circuit 16 is heated. After leaving the external condenser 38, the refrigerant continues to travel along the fourth passageway 46 toward the internal evaporator 44. The internal evaporator 44 defines a heat exchange relationship between the refrigerant and the air within the vehicle. In the internal evaporator 44, the cooled refrigerant absorbs heat from the air surrounding the internal evaporator 44, creating a refrigerative effect. The refrigerant subsequently exits the internal evaporator 44 and continues along the fourth passageway 46, ultimately returning to the compressor 28.

Upon returning to the compressor 28, refrigerant can continue through the refrigeration circuit 14 for an additional cycle. The path taken by the refrigerant during each cycle will depend upon the arrangement of the multiposition valve 48, as illustrated in FIGS. 1A and 1B.

The heat pump system of the present intervention preferably allows for dehumidification mode. FIG. 2 illustrates a second preferred embodiment of the present intervention that allows the heat pump to operate in this manner. This embodiment is identical to the embodiment detailed above except to the extent discussed below. In FIG. 2, similar reference numbers refer to similar components shown in FIG. 1. The heat pump 110 according to this embodiment includes a junction passageway 156 between the second 132 and fourth 146 passageways. This junction passageway 156 provides fluid communication between the second 132 and fourth 146 passageways. As illustrated in FIG. 2, the junction passageway 156 is preferably positioned at a point on the second passageway 132 on a refrigerant output side of the internal condenser 130. Also, the junction passageway 156 is preferably positioned at a point on the fourth passageway 146 on a refrigerant input side of the external condenser 138. In this arrangement, the junction passageway 156 allows the refrigerant to flow from the compressor 128, to the internal condenser 130, to the external condenser 138, to the internal evaporator 144, and back to the compressor 128. As a result, the air of the vehicle is cooled and then heated. FIG. 3 illustrates a preferred arrangement of a standard blower 158 relative to the internal evaporator 144 and condenser 130 that accomplishes this dehumidification. As shown in the figure, the blower 158 forces air over the internal evaporator 144, where the air is cooled, and then over the internal condenser 130, where the air is heated. As a result, the heated air within the vehicle is dehumidified.

The load on the external condenser 138 in the dehumidification mode is preferably controlled to provide for appropriate interior heating function from the internal condenser 130. Thus, as shown in FIG. 2, it is preferred that the third passageway 140 define a bypass loop 160 around the external condenser 138. It is also preferred that a proportioning valve 162 is positioned on a refrigerant inlet side of the external condenser 138. This arrangement allows for the desired control over the load on the external condenser 138. Alternatively, a pump or other flow regulating means can be used to regulate the flow of refrigerant to the external condenser 138.

Figure 4:
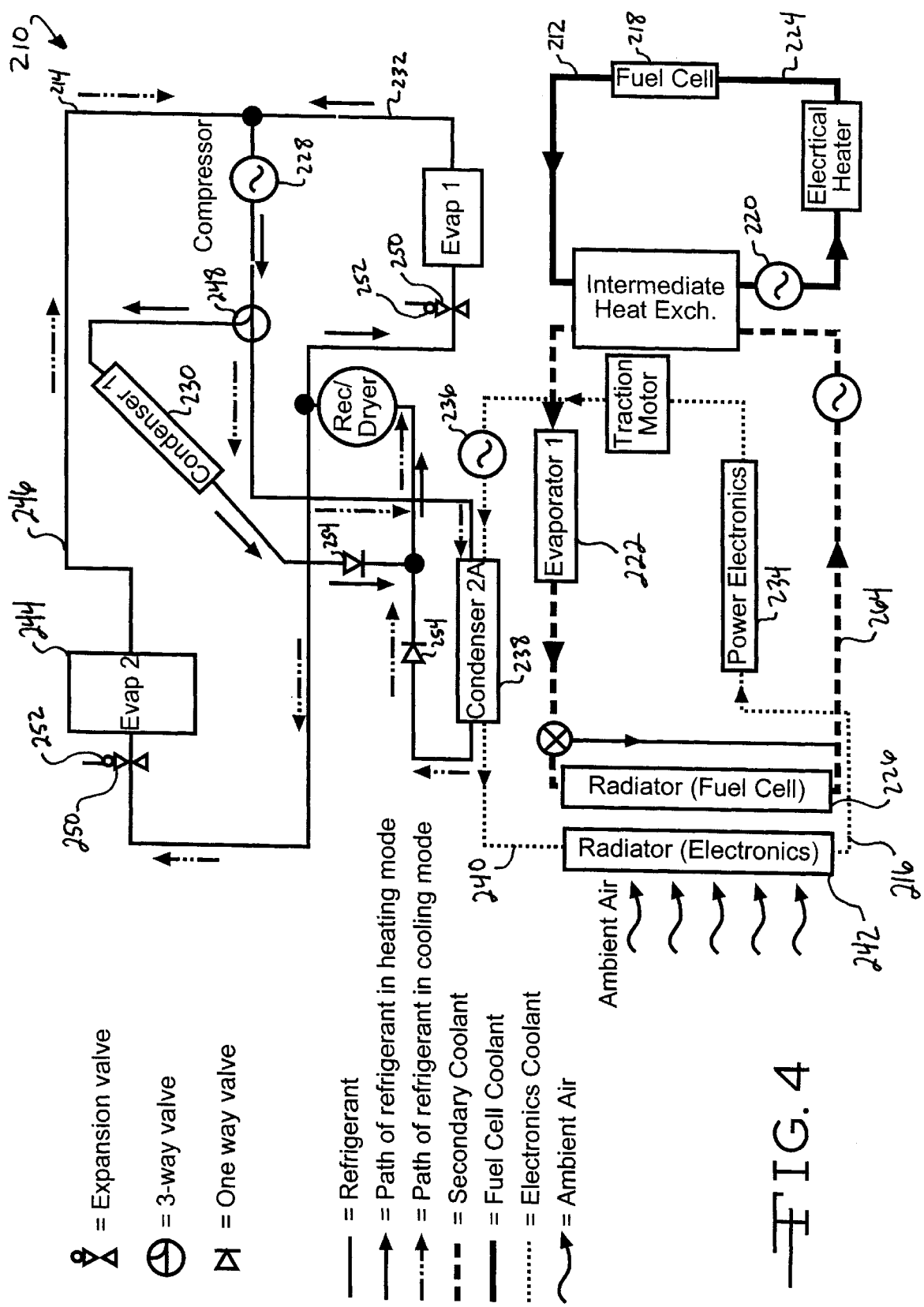
FIG. 4 is a schematic diagram view of a third preferred embodiment of a heat pump type heating and air-conditioning system for a vehicle in accordance with the present invention.

As illustrated in FIGS. 1 and 2, it is preferred that the heat pump of the present invention absorb waste heat directly from the first external coolant circuit via a coolant-to-refrigerant heat exchanger, illustrated as the external evaporator in the figures. This arrangement is well-suited for fuel cell vehicles that include a unitary fuel cell coolant circuit. Some fuel cell vehicles, however, may include primary and secondary fuel cell coolant circuits. These circuits interact with each other through additional heat exchange relationships. The present invention can also interact with the secondary coolant circuit to absorb waste heat. This third preferred embodiment is illustrated in FIG. 4. This embodiment is identical to the first preferred embodiment detailed above except to the extent discussed below. Again, similar reference numbers refer to similar components shown in FIGS. 1 and 2. In this embodiment, the first external coolant circuit 212 includes a secondary coolant circuit 264. The external evaporator 222 is preferably positioned on this secondary circuit 264. The external evaporator 222 of this alternate embodiment interacts with the refrigeration circuit 214 in a manner identical to that detailed above for the first and second preferred embodiments. Of course, this heat pump system can be modified to allow a dehumidification mode, similar to the system shown in FIG. 2.

The foregoing disclosure is the best mode devised by the inventor for practicing the invention. It is apparent, however, that several variations in accordance with the present invention may be conceivable to one of ordinary skill in the relevant art. Inasmuch as the foregoing disclosure is intended to enable such person to practice the instant invention, it should not be construed to be limited thereby, but should be construed to include such aforementioned variations. As such, the present invention should be limited only by the spirit and scope of the following claims.

What is claimed is:

1. A heat pump for a fuel cell vehicle, comprising:
   a fuel cell coolant circuit, comprising a fuel cell, a fuel cell coolant, a first fluid pump for applying a workload to the fuel cell coolant, an external evaporator, and a first passageway providing fluid communication between the first fluid pump, the fuel cell, and the external evaporator; and
   a refrigeration circuit, comprising a refrigerant, a compressor for applying a workload to the refrigerant, an internal condenser on a refrigerant output side of the compressor, the external evaporator of the fuel cell coolant circuit, and a second passageway providing fluid communication between the compressor, the internal condenser, and the external evaporator;

wherein the external evaporator communicates with the fuel cell coolant and refrigeration circuits and defines a heat exchange relationship between the fuel cell coolant and the refrigerant, and wherein the internal condenser defines a heat exchange relationship between the refrigerant and air within said vehicle.

2. A heat pump in accordance with claim 1, further comprising an electronics coolant circuit having electrical components, an electrical coolant, a second fluid pump for applying a workload to the electronics coolant, an external condenser, and a third passageway providing fluid communication between the second fluid pump, the external condenser, and the electrical components; and wherein the refrigeration circuit further comprises the external condenser of the electronics coolant circuit on a refrigerant output side of the compressor, an internal evaporator, a fourth passageway providing fluid communication between the compressor, the external condenser, and the internal evaporator, and a device positioned on a refrigerant output side of the compressor and adapted to selectively allow the refrigerant to travel within the second passageway to the internal condenser or within the fourth passageway to the external condenser;

wherein the external condenser communicates with the electronics coolant and refrigeration circuits and defines a heat exchange relationship between the electronics coolant and the refrigerant, and wherein the internal evaporator defines a heat exchange relationship between the refrigerant and air within said vehicle.

3. A heat pump in accordance with claim 2, wherein the device comprises a multi-position valve.

4. A heat pump in accordance with claim 2, further comprising an expansion valve in the second passageway positioned on a refrigerant inlet side of the external evaporator.

5. A heat pump in accordance with claim 2, further comprising an expansion valve in the fourth passageway positioned on a refrigerant inlet side of the internal evaporator.

6. A heat pump in accordance with claim 2, further comprising a valve located in the second passageway and adapted to selectively impede flow of the refrigerant to the external evaporator.

7. A heat pump in accordance with claim 2, further comprising a valve located in the fourth passageway and adapted to selectively impede flow of the refrigerant to the internal evaporator.

8. A heat pump in accordance with claim 2, further comprising a one-way valve located in the second passageway and adapted to allow refrigerant in the second passageway to flow from the internal condenser in the direction of the external evaporator and to prevent refrigerant from flowing in the opposite direction.

9. A heat pump in accordance with claim 2, further comprising a one-way valve positioned in the fourth passageway and adapted to allow refrigerant in the fourth passageway to flow from the external condenser in the direction of the internal evaporator and prevent refrigerant from flowing in the opposite direction.

10. A heat pump in accordance with claim 2, further comprising a junction passageway that provides fluid communication between the second passageway at a position on a refrigerant output side of the internal condenser and the fourth passageway at a position on a refrigerant input side of the external condenser, such that refrigerant is able to flow from the compressor, to the internal condenser, to the external condenser, to the internal evaporator, and back to the compressor.

11. A heat pump in accordance with claim 10, wherein the junction passageway includes a valve adapted to impede flow of refrigerant through the junction passageway.

12. A refrigeration circuit for a vehicle having a first external coolant circuit and a second external coolant circuit, said refrigeration circuit comprising:

a compressor for applying a workload to a refrigerant;

an internal condenser on a refrigerant output side of the compressor;

an external evaporator in communication with the internal condenser and the first external coolant circuit;

an internal evaporator;

an external condenser in communication with the internal evaporator and the second external coolant circuit.

a first passageway providing fluid communication between the compressor, the internal condenser, and the external evaporator;

a second passageway providing fluid communication between the compressor, the external condenser, and the internal evaporator; and a multi-position valve positioned on a refrigerant output side of the compressor and adapted to selectively allow the refrigerant to travel within the first passageway to the internal condenser or within the second passageway to the external condenser;

wherein the external evaporator defines a heat exchange relationship between a first coolant within said first external coolant circuit and the refrigerant; the external condenser defines a heat exchange relationship between a second coolant within said second external coolant circuit and the refrigerant; the internal condenser defines a first heat exchange relationship between the refrigerant and air within said vehicle, and wherein the internal evaporator defines a second heat exchange relationship between the refrigerant and air within said vehicle.

13. A refrigeration circuit in accordance with claim 12, further comprising a junction passageway that provides fluid communication between the first passageway at a position on a refrigerant output side of the internal condenser and the second passageway at a position on a refrigerant input side of the external condenser, such that the refrigerant is able to flow from the compressor, to the internal condenser, to the external condenser, to the internal evaporator, and back to the compressor.

14. A refrigeration circuit in accordance with claim 13, wherein the junction passageway includes a valve adapted to impede flow of refrigerant through the junction passageway.

15. A method of selectively heating or cooling air within a passenger compartment of a fuel cell vehicle having a fuel cell coolant, an electronics coolant, and a refrigerant, comprising:

absorbing waste heat from the fuel cell coolant;

transferring heat energy between the fuel cell coolant and the refrigerant;

transferring heat energy between said refrigerant and said electronics coolant; and transferring heat energy between said refrigerant and said air.

16. The method according to claim 15, wherein transferring heat energy between the fuel cell coolant and the refrigerant occurs within an external evaporator that communicates with the fuel cell coolant and the refrigerant.

17. The method of claim 16, wherein the external evaporator comprises a heat exchanger positioned within a fuel cell coolant circuit comprising said fuel cell coolant, a fluid pump, the external evaporator, and an external radiator.

18. The method of claim 17, wherein the external evaporator comprises a heat exchanger positioned within a secondary coolant circuit of the fuel cell coolant circuit.

19. The method according to claim 15, wherein transferring heat energy between the refrigerant and the electronics coolant occurs within an external condenser that is accessible by the electronics coolant and the refrigerant.

20. The method of claim 15, wherein transferring heat energy between the refrigerant and said air occurs selectively within an internal condenser accessible by the refrigerant and said air, and within an internal evaporator accessible by the refrigerant and said air.

* * * * *

UNITED STATES PATENT AND TRADEMARK OFFICE
CERTIFICATE OF CORRECTION

PATENT NO.    : 6,370,903 B1
DATED         : April 16, 2002
INVENTOR(S)   : Dick Philip Welch It is certified that error appears in the above-identified patent and that said Letters Patent is hereby corrected as shown below:

<u>Title page,</u>
Item [75], inventor's name Wlech should read -- Welch --

Signed and Sealed this

Twentieth Day of August, 2002

Attest:

Attesting Officer

JAMES E. ROGAN
*Director of the United States Patent and Trademark Office*